(12) United States Patent
Komazawa et al.

(10) Patent No.: US 11,526,308 B2
(45) Date of Patent: Dec. 13, 2022

(54) INFORMATION CONTROL APPARATUS, PRINT SYSTEM, AND NON-TRANSITORY COMPUTER READABLE MEDIUM

(71) Applicant: FUJIFILM BUSINESS INNOVATION CORP., Tokyo (JP)

(72) Inventors: Hisao Komazawa, Kanagawa (JP); Hideo Kato, Kanagawa (JP); Shingo Ichijima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 249 days.

(21) Appl. No.: 16/190,615

(22) Filed: Nov. 14, 2018

(65) Prior Publication Data
US 2019/0163410 A1    May 30, 2019

(30) Foreign Application Priority Data
Nov. 27, 2017   (JP) .............................. JP2017-226988

(51) Int. Cl.
*G06F 3/12* (2006.01)

(52) U.S. Cl.
CPC ............ *G06F 3/121* (2013.01); *G06F 3/1208* (2013.01); *G06F 3/1235* (2013.01); *G06F 3/1252* (2013.01); *G06F 3/1256* (2013.01); *G06F 3/1285* (2013.01); *G06F 3/12* (2013.01)

(58) Field of Classification Search
CPC ...... G06F 3/121; G06F 3/1285; G06F 3/1235; G06F 3/1208; G06F 3/1256; G06F 3/1252; G06F 3/1204; G06F 3/12
USPC ....................................................... 358/1.14
See application file for complete search history.

(56) References Cited

U.S. PATENT DOCUMENTS

| | | | | |
|---|---|---|---|---|
| 5,297,376 A | * | 3/1994 | Taguchi ................. | B65H 39/11 53/284.3 |
| 7,963,517 B2 | * | 6/2011 | Shiohara .................. | B65H 3/44 271/9.01 |
| 2003/0063152 A1 | * | 4/2003 | Edamura ................ | B41J 2/1752 347/36 |
| 2004/0114157 A1 | * | 6/2004 | Linder ................. | H04N 1/6033 358/1.9 |

(Continued)

FOREIGN PATENT DOCUMENTS

| | | |
|---|---|---|
| JP | H03-97372 A | 4/1991 |
| JP | 2008-173845 A | 7/2008 |

(Continued)

OTHER PUBLICATIONS

May 11, 2021 Office Action issued in Japanese Patent Application 2017-226988.

(Continued)

*Primary Examiner* — Darryl V Dottin
(74) *Attorney, Agent, or Firm* — Oliff PLC

(57) ABSTRACT

An information control apparatus controls a printer device. The printer device outputs a sheet which is fed from a sheet feeder and which is printed and loads the printed sheet in a loader in accordance with a print instruction. The information control apparatus includes a controller. In a case in which the printer device outputs a check sheet while the print instruction is being executed, the controller performs control so that the sheet feeder will feed, as a sheet to be used as the check sheet, a sheet which will protrude from other sheets when being loaded in the loader.

14 Claims, 11 Drawing Sheets

(56) References Cited

U.S. PATENT DOCUMENTS

2007/0263244 A1\* 11/2007 Sugitani ................... B41J 3/543
                                                                                            358/1.15

FOREIGN PATENT DOCUMENTS

| JP | 2008-268423 A | 11/2008 |
| --- | --- | --- |
| JP | 2009-39898 A | 2/2009 |
| JP | 2013-052593 A | 3/2013 |
| JP | 2017-13402 A | 1/2017 |

OTHER PUBLICATIONS

Aug. 3, 2021 Office Action issued in Japanese Application No. 2017-226988.

\* cited by examiner

INFORMATION CONTROL APPARATUS, PRINT SYSTEM, AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2017-226988 filed Nov. 27, 2017.

BACKGROUND

Technical Field

The present invention relates to an information control apparatus, a print system, and a non-transitory computer readable medium.

SUMMARY

According to an aspect of the invention, there is provided an information control apparatus for controlling a printer device. The printer device outputs a sheet which is fed from a sheet feeder and which is printed and loads the printed sheet in a loader in accordance with a print instruction. The information control apparatus includes a controller. In a case in which the printer device outputs a check sheet while the print instruction is being executed, the controller performs control so that the sheet feeder will feed, as a sheet to be used as the check sheet, a sheet which will protrude from other sheets when being loaded in the loader.

BRIEF DESCRIPTION OF THE DRAWINGS

Exemplary embodiments of the present invention will be described in detail based on the following figures, wherein.

DETAILED DESCRIPTION

Figure 1:
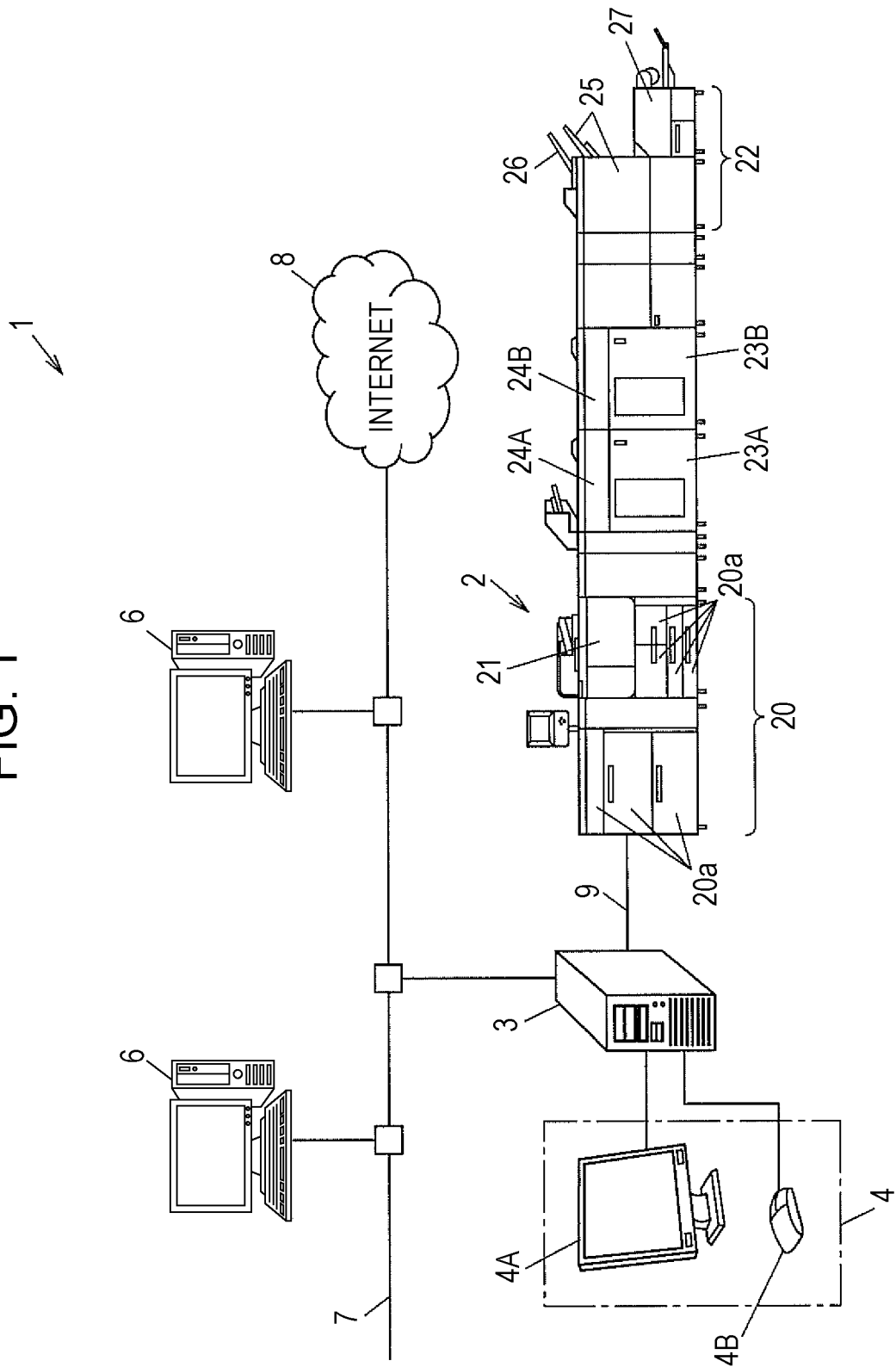
FIG. 1 illustrates an example of the configuration of a print system according to a first exemplary embodiment of the invention.

Exemplary embodiments of the invention will be described below with reference to the accompanying drawings. In the individual drawings, elements having substantially the same function are designated by like reference numeral, and an explanation thereof will not be repeated.

Overview of Exemplary Embodiments

An information control apparatus according to the exemplary embodiments controls a printer device. The printer device outputs a sheet which is fed from a sheet feeder and which is printed and loads the printed sheet in a loader in accordance with a print instruction. The information control apparatus includes a controller. In a case in which the printer device outputs a check sheet while the print instruction is being executed, the controller performs control so that the sheet feeder will feed, as a sheet to be used as the check sheet, a sheet which will protrude from other sheets when being loaded in the loader.

Among pages indicated by a print instruction (may also be called a print job), a check page is printed on a sheet as a check sheet (may also be called a sample sheet), and the printed sheet is loaded in a loader, or a blank sheet is output and loaded in a loader as a check sheet without printing the check page on the sheet. Printing of a sample sheet may also be called sample printing.

Sample printing is performed in the following cases, for example: when printing has temporarily stopped due to an error or paper out during the execution of a print job; when the execution of a print job has temporarily stopped in response to an instruction from a user; and when the insertion of a sample sheet is performed in accordance with user operation during the execution of a print job without stopping printing.

After a check page is printed as a sample on a sample sheet, it is also printed on the same type of sheet as that used before the sample sheet has been printed, and the sheets are loaded in a loader. The check page printed on a sample sheet is not necessarily constituted by one page, but plural consecutive check pages may be printed on sample sheets. As described above, one of the cases in which a sample sheet is output is when printing has temporarily stopped due to an error or paper out during the execution of a print job. In this case, the purpose of outputting a sample sheet may be to indicate a portion in which an error is occurring. For this purpose, a blank sheet may be output, or predetermined error output data may be printed and output as a sample sheet.

The sheet which will protrude from other sheets when being loaded in the loader is a sheet arranged in a direction with respect to a transport direction different from a direction in which a currently used sheet is arranged or a sheet larger than the currently used sheet. In the second case, a sheet larger than the currently used sheet in a transport direction or a direction perpendicular to the transport direction may be used. Alternatively, a sheet having the same size as the currently used sheet and being displaced in the transport direction or a direction perpendicular to the transport direction may be used.

First Exemplary Embodiment

FIG. 1 illustrates an example of the configuration of a print system 1 according to a first exemplary embodiment. The print system 1 includes a printer 2, a print server 3, a user display 4, and personal computers (PCs) 6. The printer 2 performs printing. The print server 3 controls the printer 2. The user display 4 includes a monitor 4A and an input device 4B and is connected to the print server 3. The PCs 6 are examples of plural terminal apparatuses. The printer 2 is an example of a printer device. The print server 3 is an example of an information control apparatus.

The print server 3 and the PCs 6 are connected to each other via a network 7, such as a local area network (LAN), connected to the Internet 8. The printer 2 and the print server 3 are connected to each other via a network 9, such as a LAN.

The printer 2 includes a sheet feeder 20, a printer unit 21, a post-processor 22, and plural sheet output units. The sheet feeder 20 feeds a sheet to the printer unit 21. The printer unit 21 performs printing on the sheet fed from the sheet feeder 20. The post-processor 22 performs post-processing on the sheet printed by the printer unit 21. The printed sheet is output to a sheet output unit. The sheet feeder 20 includes plural sheet feeder trays 20a. One of the plural sheet feeder trays 20a may be dedicated to the use for storing only index sheets which are output in a predetermined order. An index sheet is a sheet having a projecting portion, and information is printed on this projecting portion. The printer 2 may not necessarily include the post-processor 22. The sheet output units are examples of a loader.

Examples of the sheet output units of the printer 2 are stacker trays 23A and 23B (may also be called a stacker tray 1 and a stacker tray 2, respectively), stacker output trays 24A and 24B (may also be called a stacker output tray 1 and a stacker output tray 2, respectively), a finisher tray 25, a finisher output tray 26, and an external finisher 27. The stacker trays 23A and 23B and the finisher tray 25 have the capacity to load a large number of printed materials. The stacker output trays 24A and 24B and the finisher output tray 26 are top trays provided on the upper part of the printer 2, and have the capacity to load a small number of printed materials. The top trays are examples of a specific loader.

The print server 3 receives a print job sent from a PC 6 via the network 7 and performs control via the network 9 so that the printer 2 will perform printing in accordance with the print job. The print server 3 manages the print order of print jobs sent from the PCs 6 and also converts print data included in a print job into image data that can be processed by the printer 2.

As the monitor 4A of the user display 4, a display, such as a liquid crystal display or an organic electroluminescence (EL) display, may be used. As the input device 4B of the user display 4, a mouse and a keyboard may be used. The monitor 4A may be a touchscreen monitor that also serves as an input device as well as a display. In this case, the provision of the input device 4B may be omitted.

(Configuration of Print Server)

Figure 2:
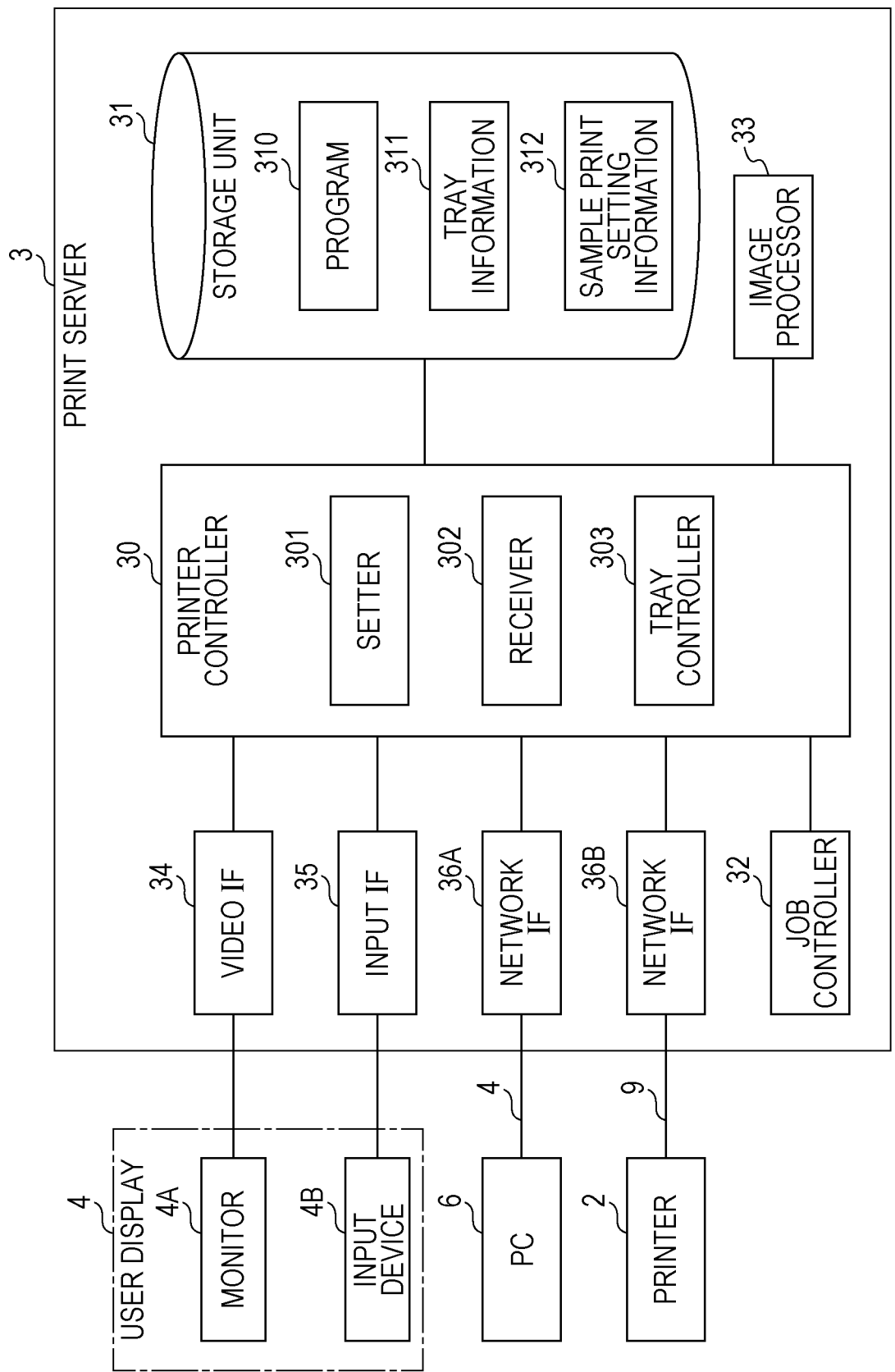
FIG. 2 is a block diagram illustrating an example of a control system of a print server.

FIG. 2 is a block diagram illustrating an example of a control system of the print server 3. The print server 3 includes a printer controller 30, a storage unit 31, a job controller 32, an image processor 33, a video interface (IF) 34, an input IF 35, and network IFs 36A and 36B. The printer controller 30 is an example of a controller.

The printer controller 30 is constituted by a central processing unit (CPU), an interface, and a memory. As a result of operating in accordance with a program 310 stored in the storage unit 31, the CPU serves as a setter 301, a receiver 302, and a tray controller 303. Details of the setter 301, the receiver 302, and the tray controller 303 will be discussed later. The setter 301 is an example of a setter.

When an error has occurred in the printer 2, the printer controller 30 receives error information indicating the content of the error from the printer 2. Upon receiving this error information, a print job temporarily stops. When the printer 2 is recovered from the error, the printer controller 30 receives from the printer 2 error recovery information indicating that the printer 2 has been recovered from the error.

The storage unit 31 is constituted by a read only memory (ROM), a random access memory (RAM), and a hard disk. In the storage unit 31, the program 310 and various items of information, such as tray information 311 and sample print setting information 312, are stored.

Examples of the tray information 311 are information concerning the sheet feeder trays 20a of the printer 2 and information concerning the sheet output units of the printer 2. Examples of the information concerning the sheet feeder trays 20a are identification information concerning the identification of the sheet feeder trays 20a, such as names, and information concerning sheets, such as types, sizes, and directions of sheets with respect to a transport direction, stored in the sheet feeder trays 20a in association with the identification information concerning the sheet feeder trays 20a. An example of the information concerning the sheet output units is identification information concerning the identification of the sheet output units, such as names.

Examples of the sample print setting information 312 are information concerning a sample sheet, such as the type and size of a sheet to be used as a sample sheet, and the direction of this sheet with respect to the transport direction, and information concerning the sheet feeder tray 20a and the sheet output unit to be used for sample printing.

The job controller 32 receives print jobs from the PCs 6 and manages the print order of the received print jobs. The job controller 32 also instructs the printer controller 30 to execute the received print jobs. A print job includes header information and print data, for example, in this order. The print data is page data converted from document data and is described in a page description language (PDL) that can be interpreted by the printer 2. Examples of the header information are print control information and information concerning the sheet feeder tray 20a and the sheet output unit used for printing.

The image processor 33 performs image processing, which is required for printing in the printer 2, on print data. Examples of the image processing are interpreting processing for a PDL and raster image processor (RIP) processing for converting PDL print data into raster image data.

After error information has been received from the printer 2 and a print job has temporarily stopped, when the printer controller 30 receives error recovery information, the setter 301 executes the following processing. The setter 301 displays a screen for setting a sheet to be used as a sample sheet on the monitor 4A and stores the content of settings set by a user using the input device 4B in the storage unit 31 as the sample print setting information 312. The sample print setting information 312 may be preset before a print job temporarily stops.

The receiver 302 receives an instruction to execute sample printing from the user display 4 when a print job has temporarily stopped.

The tray controller 303 obtains tray information concerning the printer 2 by communicating with the printer 2 and stores it in the storage unit 31 as the tray information 311. The tray controller 303 also provides the printer 2 with an instruction concerning which sheet feeder tray 20a will be used to feed a sheet as a sample sheet and concerning which sheet output unit will be used to output the sample sheet in accordance with the sample print setting information 312 stored in the storage unit 31.

In a case in which the printer 2 prints a sample sheet while a print job is being executed, the tray controller 303 performs control so that the sheet feeder 20 will feed, as a sheet to be used as a sample sheet, a sheet which will protrude from other sheets when being loaded in a loader. That is, the tray controller 303 performs control so that a sheet set by the setter 301, a sheet arranged in a direction with respect to a transport direction different from the direction of a currently used sheet, or a sheet larger than the currently used sheet will be used as a sample sheet.

If the page corresponding to a sample sheet is blank, the tray controller 303 may perform control so that a screen for checking whether a sample sheet will be output will be displayed on the monitor 4A.

If the sheet which will protrude from other sheets when being loaded in a loader is not stored in any sheet feeder tray 20a, the tray controller 303 may perform control so that a screen for checking whether to use the same type of sheet as the currently used sheet will be displayed on the monitor 4A. If the same type of sheet as the currently used sheet is used as a sample sheet, the tray controller 303 may perform control so that the sample sheet will be output to a loader different from that used for the currently used sheet.

If the sheet output unit used for a sample sheet is a predetermined specific loader, such as a top tray, and if this specific loader is the same as that indicated in a print job, the tray controller 303 may perform control so that the execution of the print job will temporarily stop after the sample sheet is output to the specific loader.

(Operation of First Exemplary Embodiment)

An example of the operation of the print system 1 according to the first exemplary embodiment will be described below with reference to FIGS. 3 through 6. FIG. 6 is a flowchart illustrating an example of the operation of the print server 3.

If a print job has temporarily stopped for some reason, such as an error or paper out, the setter 301 of the print server 3 receives settings for sample printing. The setter 301 then stores information concerning the received settings in the storage unit 31 as the sample print setting information 312. The receiver 302 displays a screen for receiving an instruction to execute sample printing on the monitor 4A.

A user provides an instruction to execute sample printing on the screen displayed on the monitor 4A by operating the input device 4B. Then, the receiver 302 receives this instruction in step S1.

In step S2, by referring to the header information of a print job, the tray controller 303 judges whether the sheet output unit indicated in the print job is set to be a top tray. If it is found in step S2 that the sheet output unit is not set to be a top tray (NO in step S2), the print server 3 proceeds to step S3. In step S3, the tray controller 303 performs control so that a sheet will be fed from the sheet feeder tray 20a indicated in the print job, be printed as a sample sheet, and be output to a top tray. More specifically, a check page is printed on a sheet fed from the sheet feeder 20a as a sample sheet, and the sample sheet is output to a top tray which is specified by the sample print setting information 312 as the sheet output unit for the sample sheet, such as the finisher output tray 26.

If the sheet output unit indicated in the print job is set to be a top tray (YES in step S2), the print server 3 proceeds to step S4. In step S4, by referring to the tray information 311, the tray controller 303 checks for a sheet feeder tray 20a which stores sheets of the same size as the currently used sheet and arranged in a direction with respect to a transport direction different from the direction of the currently used sheet. That is, if the direction of the currently used sheet with respect to the transport direction is short edge feed (SEF), the tray controller 303 checks for a sheet feeder tray 20a which stores long edge feed (LEF) sheets. If the direction of the currently used sheet is LEF, the tray controller 303 checks for a sheet feeder tray 20a which stores SEF sheets.

If a sheet feeder tray 20a which stores sheets of the same size as the currently used sheet and arranged in a direction with respect to the transport direction different from the direction of the currently used sheet is found (YES in step S4), the print server 3 proceeds to step S5. In step S5, the tray controller 303 performs control so that a sheet will be fed from this sheet feeder tray 20a as a sample sheet.

Figure 3:
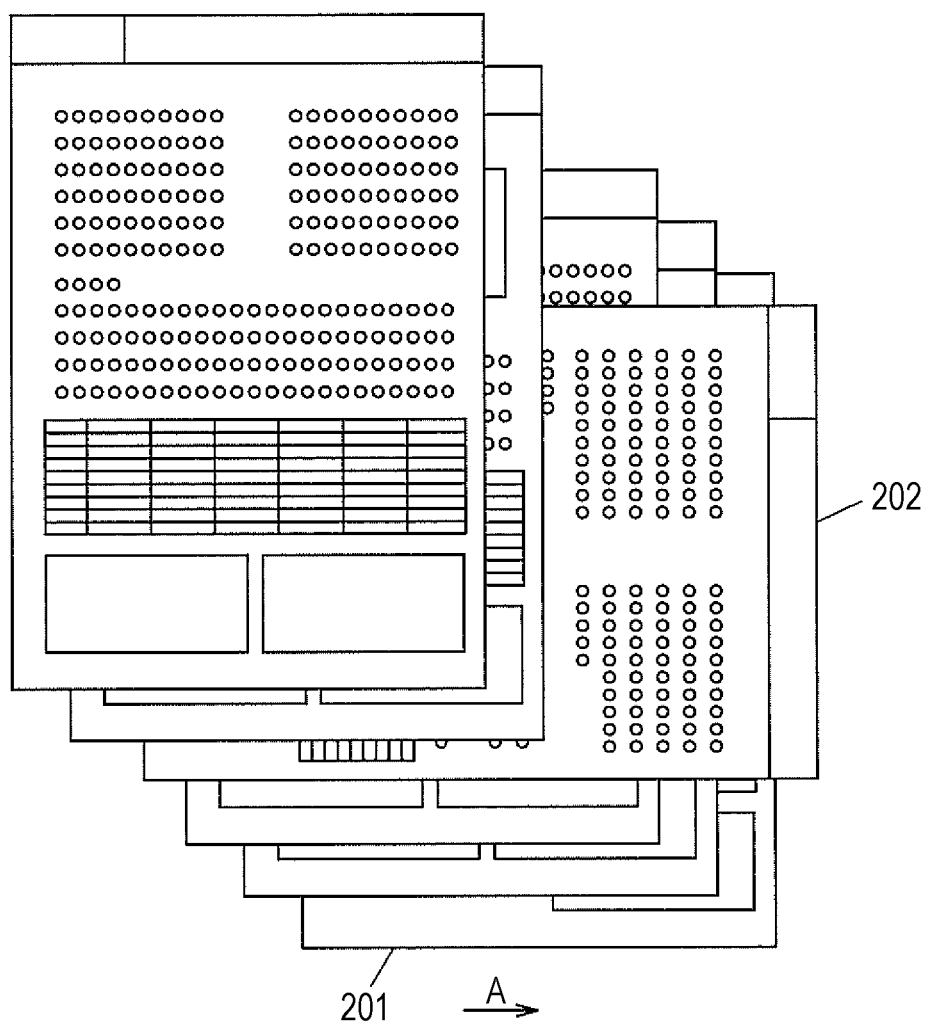
FIGS. 3 and 4 illustrate examples of a state in which a sample sheet is inserted.

FIG. 3 illustrates a state in which an SEF sample sheet 202 is inserted between LEF sheets 201. In this state, when printed sheets are loaded in the same sheet output unit, a user can identify the position of the sample sheet 202 because the sample sheet 202 is longer than the other sheets 201 in the transport direction A.

If it is found in step S4 that there is no sheet feeder tray 20a which stores sheets of the same size as the currently used sheet and arranged in a direction with respect to the transport direction different from the direction of the currently used sheet, the print server 3 proceeds to step S6. In step S6, by referring to the tray information 311, the tray controller 303 checks for a sheet feeder tray 20a which stores sheets larger than the currently used sheet 201.

If a sheet feeder tray 20a which stores sheets larger than the currently used sheet 201 is found (YES in step S6), the tray controller 303 performs control so that a sheet will be fed from this sheet feeder tray 20a in step S7.

Figure 4:
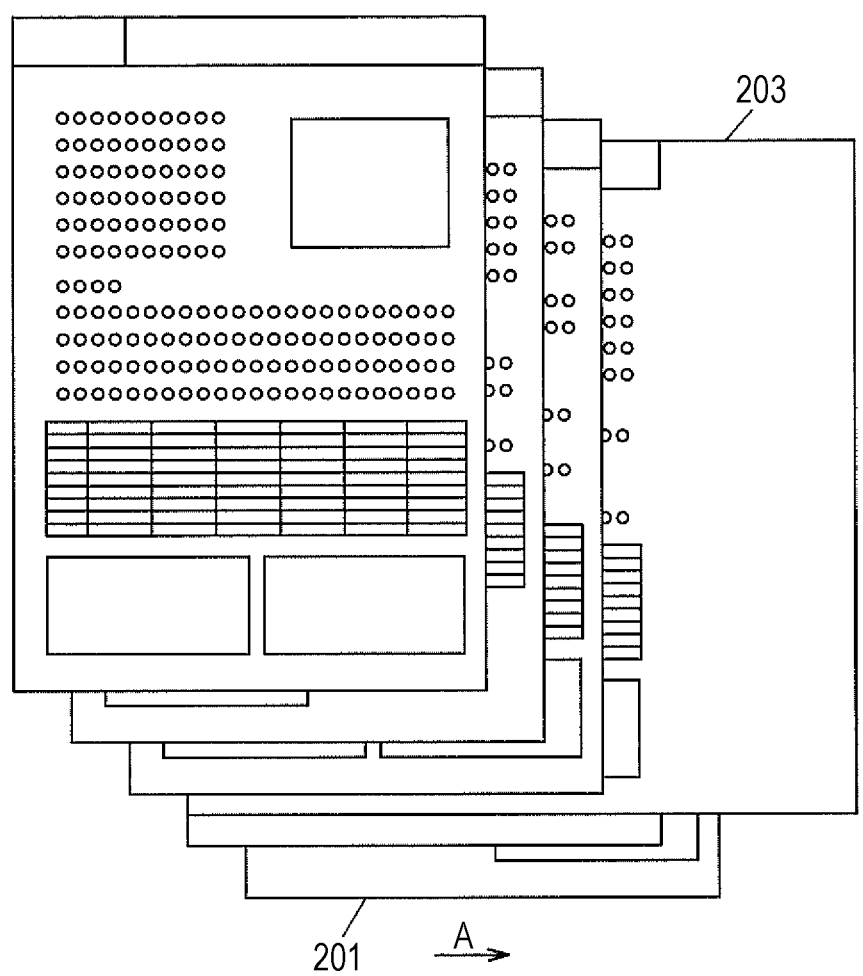

FIG. 4 illustrates a state in which a sheet larger than a currently used sheet 201 is inserted as a sample sheet 203. For example, if the currently used sheet 201 is an A4 size sheet and if the direction of the currently used sheet 201 is LEF, a sheet having the same length in the direction perpendicular to the transport direction A as the long sides of the A4 size sheet and having a width in the transport direction A longer than the short sides of the A4 size sheet is used as the sample sheet 203. In this state, when printed sheets are loaded in the same sheet output unit, a user can identify the position of the sample sheet 203 because the sample sheet 203 is longer than the currently used sheet 201 in the transport direction A.

Figure 5:
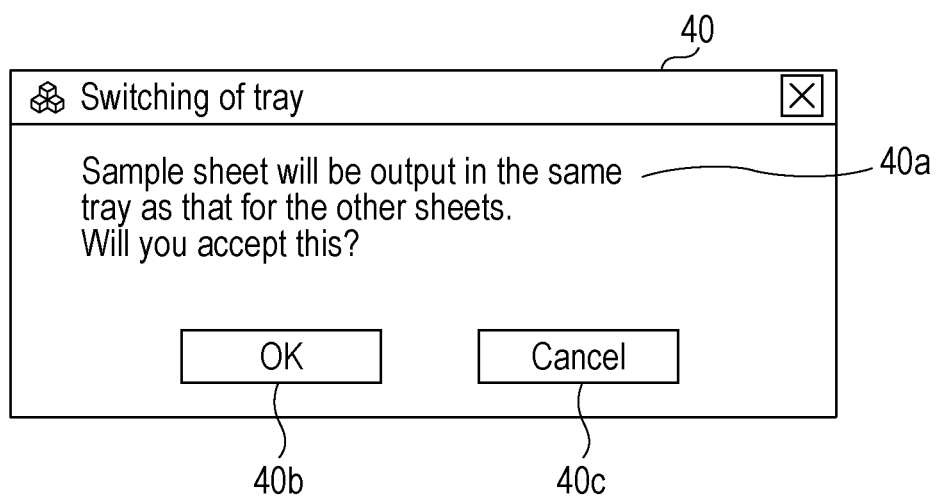
FIG. 5 illustrates an example of a checking screen displayed on a monitor.
Figure 6:
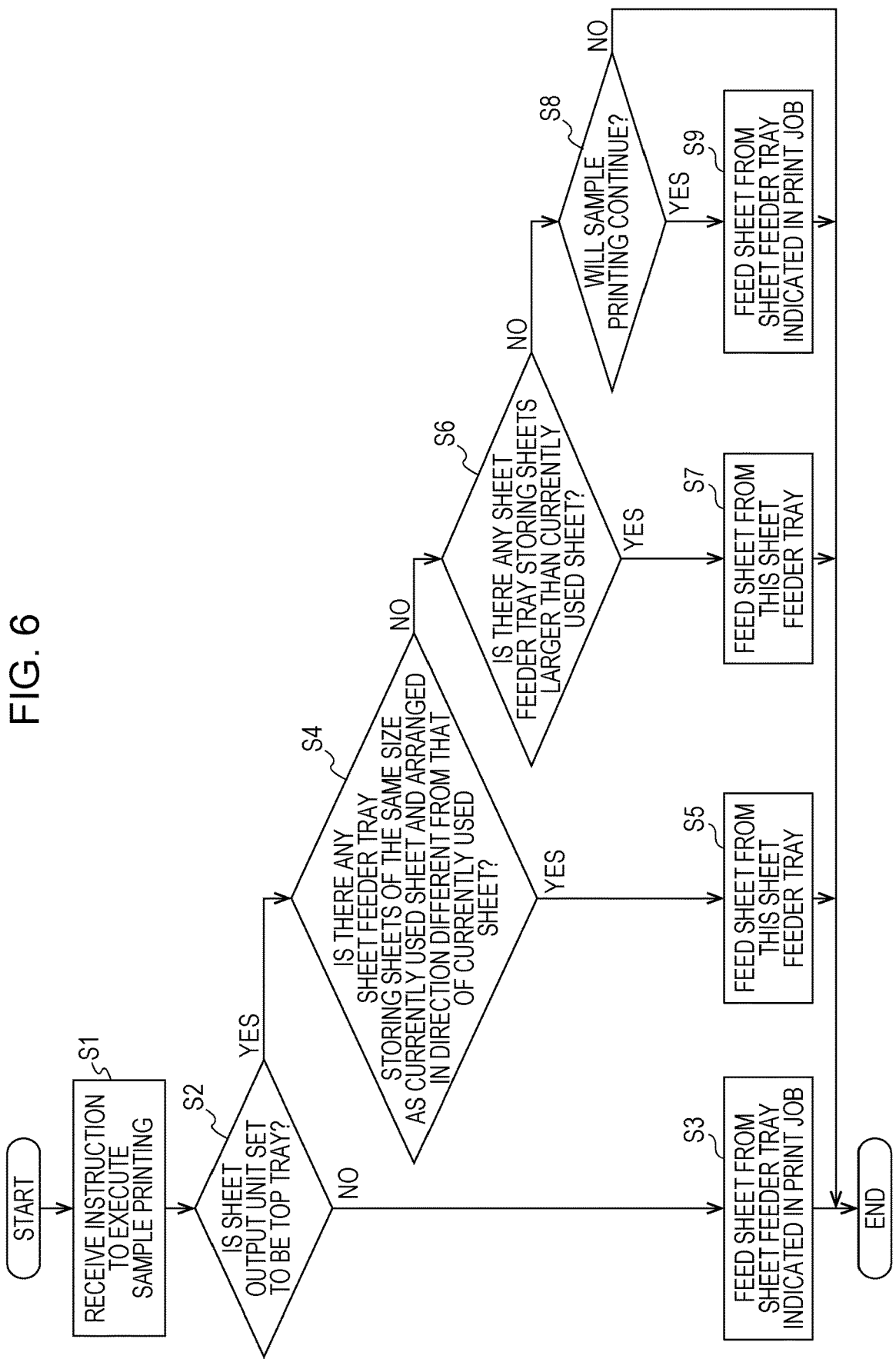
FIG. 6 is a flowchart illustrating an example of the operation of the print server according to the first exemplary embodiment.

If no sheet feeder tray 20a which stores sheets larger than the currently used sheet 201 is found (NO in step S6), the tray controller 303 checks whether to continue sample printing by displaying a checking screen shown in FIG. 5 in step S8.

FIG. 5 illustrates an example of the checking screen. On a checking screen 40, a message 40a indicating that the sample sheet will be output in the same tray as that for the other sheets in the print job is displayed. An "OK" button 40b and a "Cancel" button 40c are also displayed.

If the "OK" button 40b is operated on the checking screen 40 (YES in step S8), the tray controller 303 performs control so that a sheet from the sheet feeder tray 20a indicated in the print job will be fed as a sample sheet in step S9.

Second Exemplary Embodiment

In the first exemplary embodiment, if the sheet output unit indicated in a print job is a top tray, a sheet arranged in a direction different from the direction of a currently used sheet or a sheet larger than the currently used sheet is used so that the printed sample sheet will protrude from other sheets when being loaded in the top tray. In a second exemplary embodiment, an unused top tray is used. An unused top tray is a tray in which no sheets are loaded. The second exemplary embodiment will be discussed below by principally referring to points different from the first exemplary embodiment.

In the second exemplary embodiment, if the sheet output unit indicated in a print job is set to be a top tray, the tray controller 303 performs control so that a sample sheet will be output to an unused top tray. If no unused top tray is available, the tray controller 303 performs control so that an instruction to select a sheet output unit will be provided to a user and the sample sheet will be output to the sheet output unit selected by the user.

(Operation of Second Exemplary Embodiment)

Figure 7:
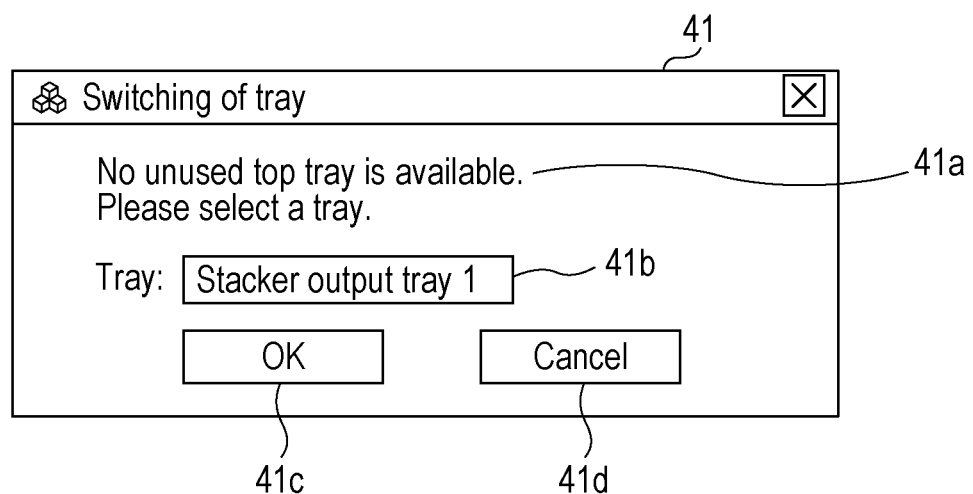
FIG. 7 illustrates an example of a query screen displayed on the monitor.
Figure 8:
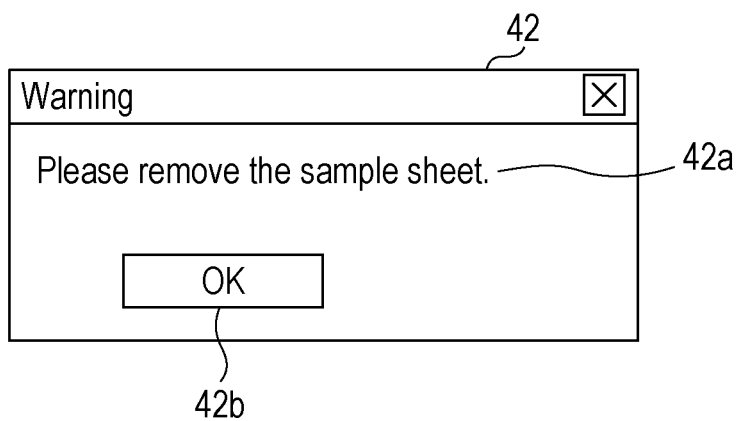
FIG. 8 illustrates an example of a warning screen displayed on the monitor.
Figure 9:
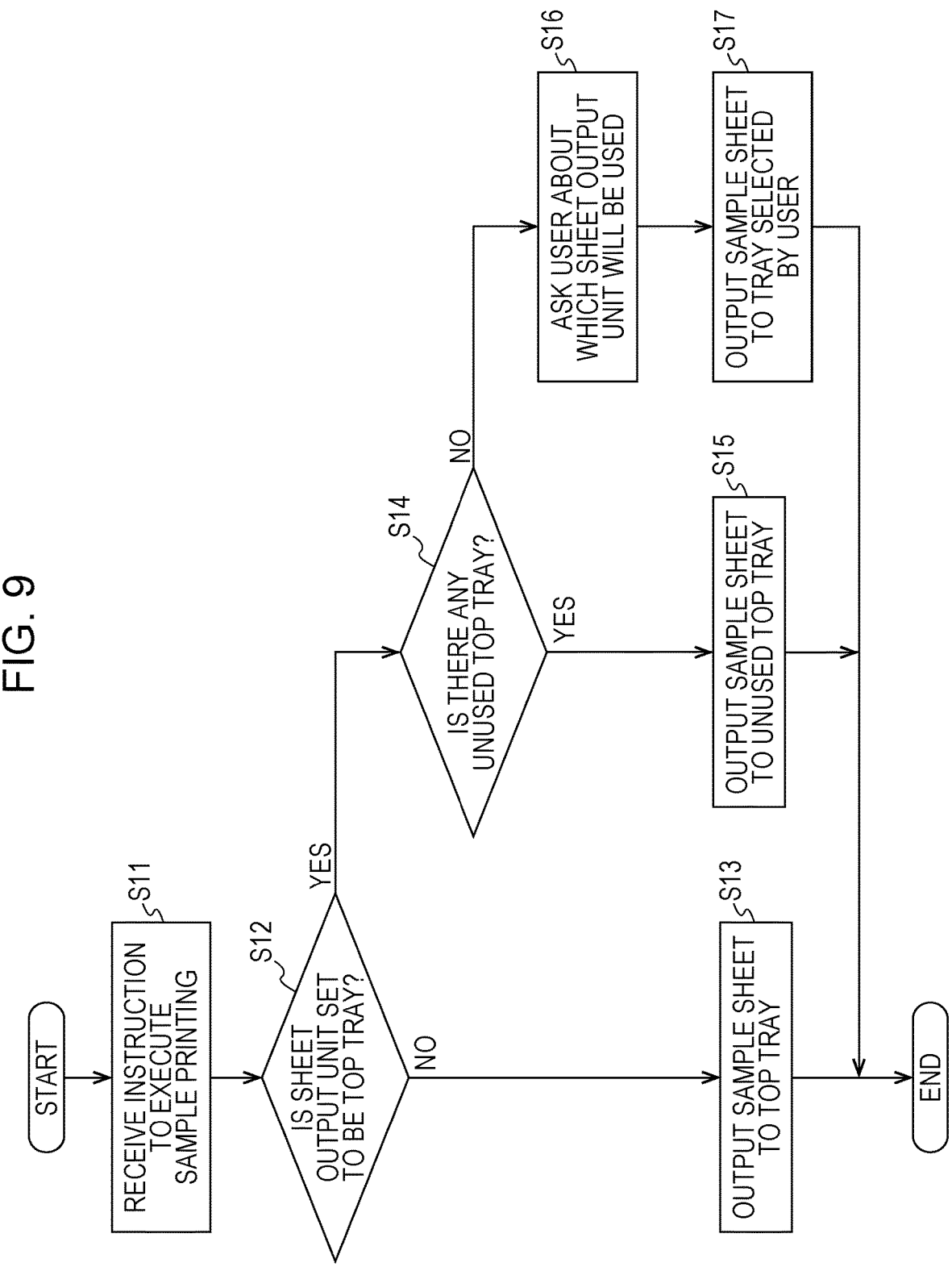
FIG. 9 is a flowchart illustrating an example of the operation of the print server according to a second exemplary embodiment.

An example of the operation of the print system 1 according to the second exemplary embodiment will be described below with reference to FIGS. 7 through 9. FIGS. 7 and 8 illustrate examples of screens displayed on the monitor 4A. FIG. 9 is a flowchart illustrating an example of the operation of the print server 3.

If a print job has temporarily stopped for some reason, such as an error or paper out, the setter 301 of the print server 3 receives settings for sample printing. The setter 301 then stores information concerning the received settings in the storage unit 31 as the sample print setting information 312. The receiver 302 displays a screen for receiving an instruction to execute sample printing on the monitor 4A.

A user provides an instruction to execute sample printing on the screen displayed on the monitor 4A by operating the input device 4B. Then, the receiver 302 receives this instruction in step S11.

In step S12, by referring to the header information of a print job, the tray controller 303 judges whether the sheet output unit indicated in the print job is set to be a top tray. If it is found in step S12 that the sheet output unit is not set to be a top tray (NO in step S12), the tray controller 303 performs control so that a sample sheet will be output to one of the top trays in step S13. More specifically, a check page is printed on a sheet fed from the sheet feeder tray 20a indicated in the print job as a sample sheet, and the sample sheet is output to one of the top trays as the sheet output unit for the sample sheet.

If the sheet output unit indicated in the print job is set to be a top tray (YES in step S12), the tray controller 303 judges in step S14 whether an unused top tray is available, that is, whether an unused top tray in which no sheets are loaded is available among the plural top trays.

If an unused top tray is available (YES in step S14), the tray controller 303 performs control so that a sample sheet will be output to this unused top tray in step S15. The user can easily find the sample sheet loaded in the unused top tray among the used top trays.

If no unused top tray is available (NO in step S14), the tray controller 303 performs control so that an instruction to select a sheet output unit will be provided to the user in step S16, as shown in FIG. 7.

FIG. 7 illustrates an example of a query screen. On a query screen 43, a message 41a is displayed to inform the user that no unused top tray is available to output a sample sheet and to instruct the user to select a sheet output unit. An input field 41b, an "OK" button 41c, and a "Cancel" button 41d are also displayed. The user inputs a sheet output unit in the input field 41b by selecting it from a pull-down menu and operates the "OK" button 41d.

In step S17, the tray controller 303 performs control so that the sample sheet will be output to the sheet output unit selected by the user.

In a case in which the subsequent print job is executed, if the sheet output unit indicated in this print job is the same as that to which the sample sheet has been output and if the sample sheet has not yet been removed, the tray controller 303 performs control so that a warning screen will be displayed on the monitor 4A to instruct the user to remove the sample sheet, as shown in FIG. 8. An optical element provided on the top tray can detect that the sample sheet has not been removed.

FIG. 8 illustrates an example of a warning screen. On a waring screen 42, a message 42a to instruct the user to remove a sample sheet and an "OK" button 42b are displayed. The user removes the sample sheet and operates the "OK" button 42b, and then, the printer controller 30 performs control so that the printer 2 will restart executing the subsequent print job.

The second exemplary embodiment has been discussed, assuming that plural top trays are provided in the printer 2. However, the present invention is also applicable to a printer having only a single top tray.

First and Second Modified Examples

Modified examples will be discussed below. In response to a request to set a sheet output unit used for a sample sheet in sample printing or to set a sheet used as a sample sheet, or when the execution of a print job has temporarily stopped, the setter 301 may display a setting screen on the monitor 4A to allow a user to set settings for sample printing or to set settings for a sample sheet.

Figure 10:
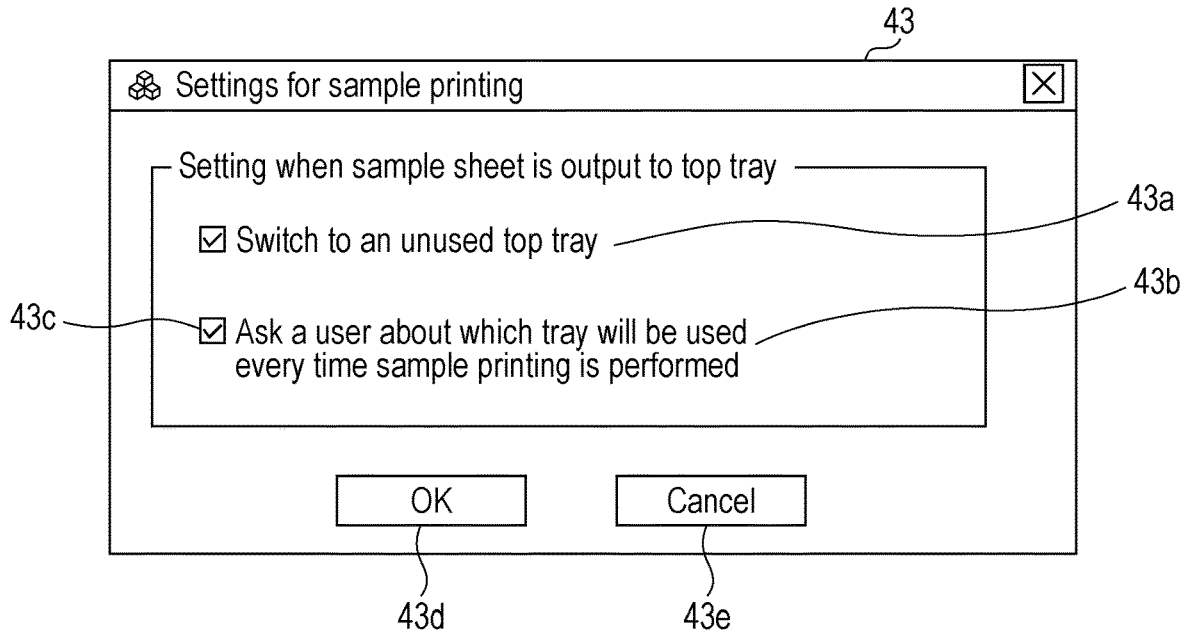
FIG. 10 illustrates an example of a setting screen for sample printing according to a first modified example.

FIG. 10 illustrates an example of a setting screen for sample printing according to a first modified example. On a setting screen 43 for sample printing shown in FIG. 10, as a setting when a sample sheet is output to a top tray, an option 43a "Switch to an unused top tray" and an option 43b "Ask a user about which tray will be used every time sample printing is performed" are displayed. Check boxes 43c for selecting the options 43a and 43b are also indicated. An "OK" button 43d for setting the content of a setting and a "Cancel" button 43e for canceling the content of a setting are also displayed.

If the user selects the option 43a "Switch to an unused top tray" and operates the "OK" button 43d, the tray controller 303 stores the content of this setting in the storage unit 31 as the sample print setting information 312. Thereafter, the tray controller 303 performs control so that a sample sheet will be output to an unused top tray.

If the user checks the option 43b "Ask a user about which tray will be used every time sample printing is performed" and operates the "OK" button 43d, the tray controller 303 stores the content of this setting in the storage unit 31 as the sample print setting information 312. Thereafter, the tray controller 303 performs control so that, every time sample printing is performed, a query screen will be displayed on the monitor 4A to instruct a user to select a sheet output unit and a sample sheet will be output to the sheet output unit selected by the user.

If both of the options 43a and 43b are selected, the tray controller 303 performs control so that the operation of the content of the option 43a "Switch to an unused top tray" will preferentially be executed.

Figure 11:
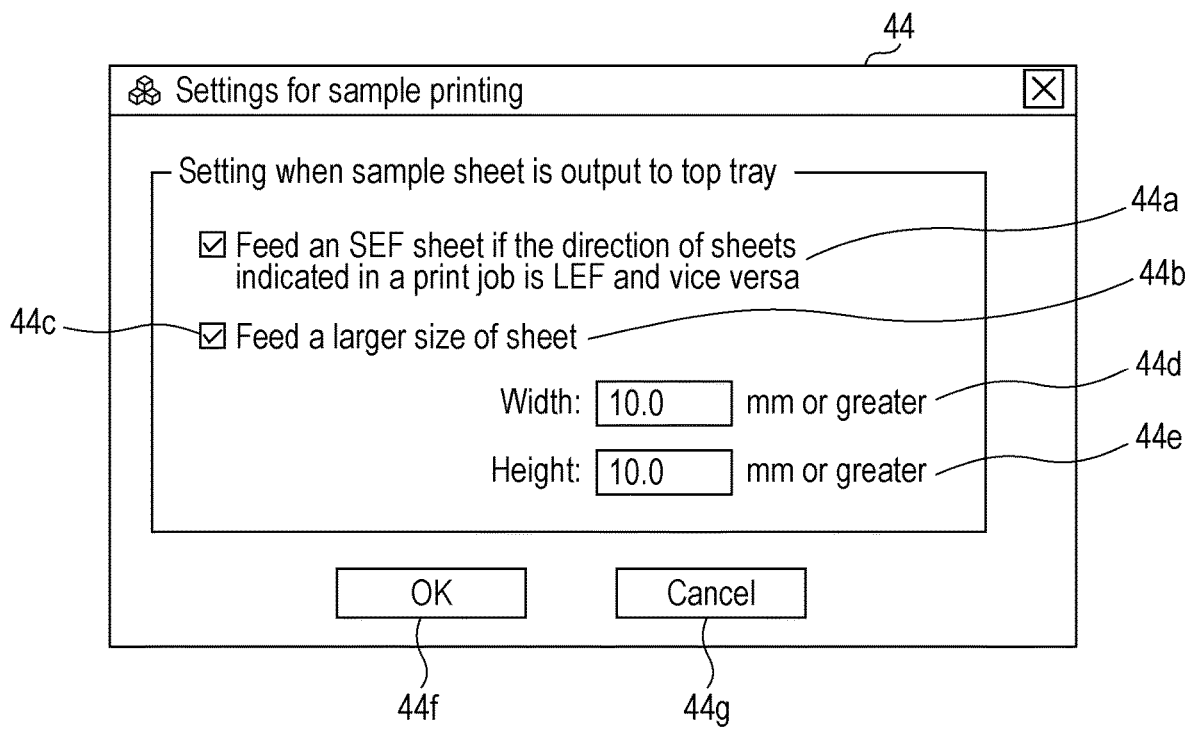
FIG. 11 illustrates an example of a setting screen for sample printing according to a second modified example.

FIG. 11 illustrates an example of a setting screen for sample printing according to a second modified example. On a setting screen 44 for sample printing shown in FIG. 11, as a setting when a sample sheet is output to a top tray, an option 44a "feed an SEF sheet if the direction of sheets indicated in a print job is LEF and vice versa" and an option 44b "feed a larger size of sheet" are displayed. Check boxes 44c for selecting the options 44a and 44b are also indicated.

A width input field 44*d* and a height input field 44*e* are also provided for the option 44*c*. An "OK" button 44*f* for setting the content of a setting and a "Cancel" button 44*g* for canceling the content of a setting are also displayed. The width input field 44*d* and the height input field 44*e* are provided so that the user can specify a width and a height greater than the size of sheets set in the print job. The user can input the width and the height by selecting numeric values from pull-down menus.

If the user selects the option 44*a* "feed an SEF sheet if the direction of sheets indicated in a print job is LEF and vice versa" and operates the "OK" button 44*f*, the tray controller 303 stores the content of this setting in the storage unit 31 as the sample print setting information 312. Thereafter, the tray controller 303 performs control so that an SEF sheet will be fed from a sheet feeder tray 20*a* if the direction of sheets indicated in a print job is LEF and vice versa.

If the user selects the option 44*b* "feed a larger size of sheet" and inputs values in the width input field 44*d* and the height input field 44*e*, and then operates the "OK" button 44*f*, the tray controller 303 stores the content of this setting in the storage unit 31 as the sample print setting information 312. Thereafter, the tray controller 303 performs control so that, when sample printing is performed, a sheet of size indicated by the sample print setting information 312 will be fed from a sheet feeder tray 20*a*.

If both of the options 44*a* and 44*b* are selected, the tray controller 303 performs control so that the operation of the content of the option 44*a* "feed an SEF sheet if the direction of sheets indicated in a print job is LEF and vice versa" will preferentially be executed.

Third Modified Example

Figure 12:
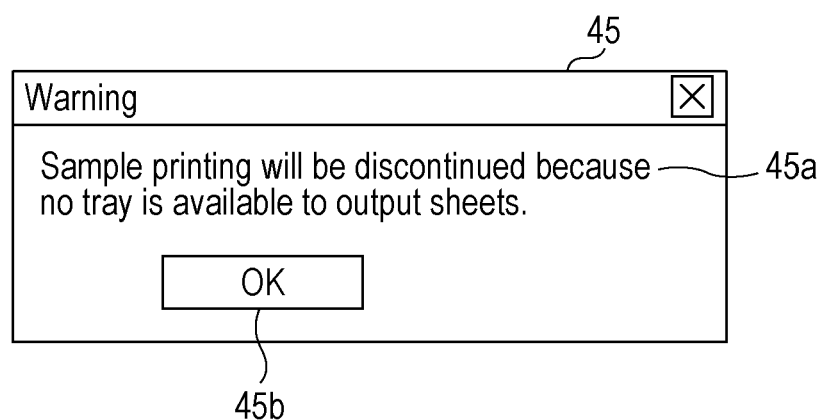
FIG. 12 illustrates an example of a warning screen according to a third modified example.

FIG. 12 illustrates an example of a warning screen according to a third modified example. On a warning screen 45 in FIG. 12, a message 45*a* indicating that sample printing will be discontinued because no tray is available to output a sample sheet is displayed. An "OK" button 45*b* is also displayed. If no settings have been made on the setting screen 43 or 44, the tray controller 303 may perform control so that the warning screen 45 will be displayed on the monitor 4A.

If the user operates the "OK" button 45*b*, the printer controller 30 stops executing sample printing. In response to an instruction to restart the print job from the user, the printer controller 30 performs control so that the printer 2 will restart the print job.

Fourth Modified Example

Some printers have the function of inserting an index sheet (may also be called a tab sheet) which makes the headings of chapters and sections of a printed material noticeable. To avoid the disturbance of the output order of index sheets or to minimize the use of index sheets which are more expensive than plain sheets, if a specific type of sheet, such an index sheet, is set as a sheet for printing a check page, a user may be allowed to reselect a sheet to be used as a sample sheet instead of using this specific type of sheet.

Figure 13A:
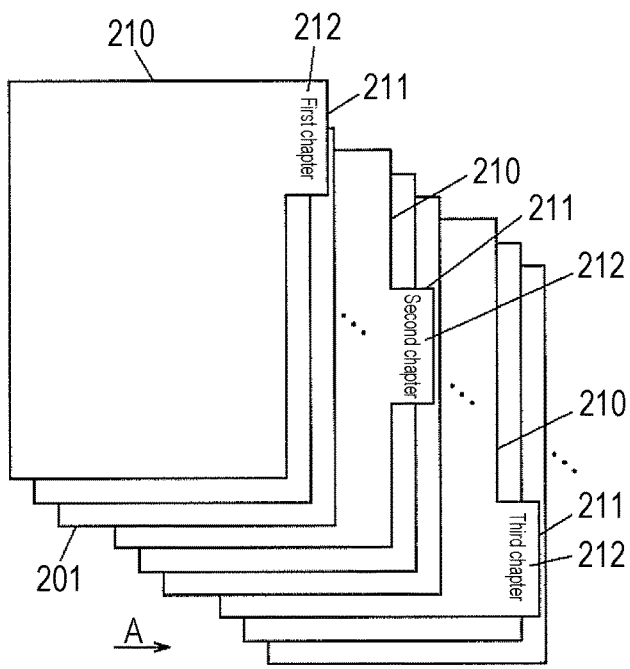
FIGS. 13A through 13C illustrate a fourth modified example.

FIG. 13A illustrates an example of the state of the use of index sheets. An index sheet 210 has a tab 211 which is a portion projecting from the other portion of the index sheet 210. Index information 212 is recorded on the tab 211. Examples of the index information 212 are characters, symbols, and figures. The index sheet 210 is an example of a specific type of sheet. The tab 211 is an example of a projecting portion. The index information 212 is an example of information printed on the projecting portion.

If a sheet to be used as a sample sheet is a predetermined specific type of sheet, the tray controller 303 may perform control so that this sheet will not be used as a sample sheet or so that another predetermined type of sheet will be used as a sample sheet. Examples of the specific type of sheet are an index sheet, a coated sheet, and a glossy sheet.

Figure 13B:
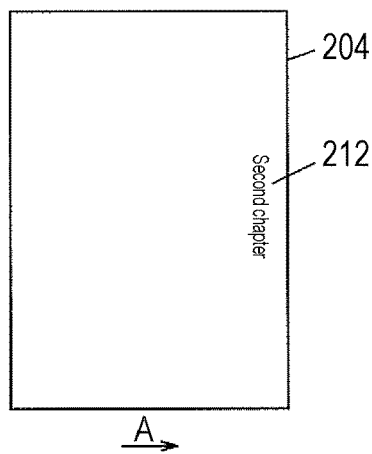
Figure 13C:
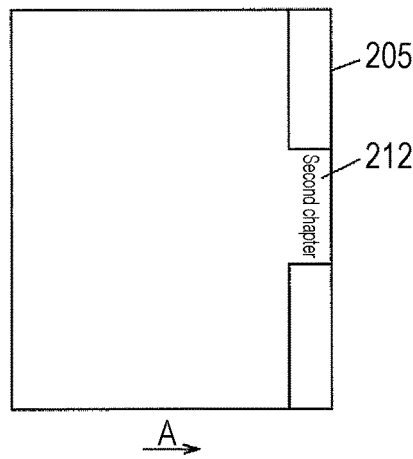

If the specific type of sheet is an index sheet, the tray controller 303 may perform control so that only the index information 212 which is supposed to be printed on the tab 211 will be printed on a sheet other than the specific type of sheet. For example, only the index information 212 may be printed on a sample sheet 204 shown in FIG. 13B having the same size as that of a currently used sheet. Alternatively, the same image as that on the index sheet 210 may be printed on a sample sheet 205 shown in FIG. 13C which is large enough to contain the tab 211. The width of the sample sheet 205 in the transport direction A is greater than or equal to the longest width of the index sheet 210 shown in FIG. 13A. In the sample sheets 204 and 205 shown in FIGS. 13B and 13C, the position of the index information 212 in a direction perpendicular to the transport direction A is the same as that on the index sheet 210. This allows a user to recognize the index information 212 more easily than when the index information 212 is printed at a fixed position regardless of the position on the index sheet 210. Only the index information 212 may be printed on the sample sheet 205 shown in FIG. 13C.

Although the exemplary embodiments have been discussed above, the present invention is not restricted thereto. Various modifications may be made without departing from the spirit and scope of the invention. For example, the printer 2 may have the functions of the print server 3 as a controller. In the above-described exemplary embodiments, sample printing is performed when a print job has temporarily stopped for some reason, such as an error or paper out. In the invention, however, sample printing may be performed without stopping the execution of a print job. For example, sample printing may be performed as a result of a user pressing a graphical user interface (GUI) software icon or a hardware button provided near a sheet output unit.

All or some of the elements of the printer controller 30 of the print server 3 may be constituted by a hardware circuit, such as a field programmable gate array (FPGA) or an application specific integrated circuit (ASIC).

Some of the elements of the above-described exemplary embodiments may be omitted or changed without departing from the spirit and scope of the invention. In the flowcharts of the above-described exemplary embodiments, steps may be added, deleted, changed, or replaced without departing from the spirit and scope of the invention. The program used in the above-described exemplary embodiments may be provided as a result of being recorded in a computer readable recording medium, such as a compact disc-read only memory (CD-ROM). The program may be stored in an external server, such as a cloud server, and be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information control apparatus for controlling a printer, the printer being configured to output sheets which are, in order, fed from a sheet feeder, printed upon and loaded in a first loader or a second loader in accordance with a print instruction, the information control apparatus comprising:
   a controller configured to
      control the printer to output the sheets according to the print instruction,
      control the printer to output a check sheet and load the check sheet after the print instruction has been started but before all of the sheets have been printed upon and loaded, the check sheet being in addition to the sheets,
      determine whether the sheets and the check sheet are being output to a same one of the first loader or the second loader, and
      control the printer so the check sheet protrudes from the sheets when the sheets and the check sheet are being output to the same one of the first loader or the second loader.

2. The information control apparatus according to claim 1, wherein the check sheet is a sheet arranged in a direction with respect to a transport direction different from a direction in which is the sheets are arranged or a sheet larger than the sheets.

3. The information control apparatus according to claim 1, wherein the check sheet is a predetermined specific type of sheet and the controller controls the printer so that the sheets will not be used as the check sheet.

4. The information control apparatus according to claim 1, wherein the check sheet is a predetermined specific type of sheet and the controller controls the printer so that a different predetermined type of sheet is used as the check sheet.

5. The information control apparatus according to claim 4, wherein the predetermined specific type of sheet has a projecting portion and the controller controls the printer so that information to be printed on the projecting portion is printed on the different predetermined type of sheet.

6. The information control apparatus according to claim 5, wherein the different predetermined type of sheet is a same type of sheet as a currently used sheet different from the predetermined specific type of sheet or is large enough to contain the projecting portion.

7. The information control apparatus according to claim 1, further comprising:
   a setter that displays a setting screen for setting the check sheet,
   wherein the controller controls the printer so that the sheet feeder will feed the check sheet which is set by the setter.

8. The information control apparatus according to claim 7, wherein a sheet arranged in a direction with respect to a transport direction different from the sheets are arranged and a sheet larger than the sheets are both set on the setting screen and the controller controls the printer so that the sheet feeder will preferentially feed a sheet arranged in a direction with respect to the transport direction different from a direction in which the sheets are arranged.

9. The information control apparatus according to claim 1, wherein a page corresponding to the check sheet is blank and the controller controls the printer to display a screen for checking whether the check sheet will be output.

10. The information control apparatus according to claim 1, wherein the check sheet is not stored in the sheet feeder and the controller controls the printer to display a screen for checking whether to use the same type of sheet as the sheets.

11. The information control apparatus according to claim 1, wherein the controller controls the printer so that printing based on the print instruction will temporarily stop after the check sheet is output.

12. A print system comprising:
   a printer that outputs sheets which are, in order, fed from a sheet feeder, printed upon and loaded in a first loader or a second loader in accordance with a print instruction; and
   a controller configured to
      control the printer to output the sheets according to the print instruction,
      control the printer to output a check sheet and load the check sheet after the print instruction has been started but before all of the sheets have been printed upon and loaded, the check sheet being in addition to the sheets,
      determine whether the sheets and the check sheet are being output to a same one of the first loader or the second loader, and
      control the printer so the check sheet protrudes from the sheets when the sheets and the check sheet are being output to the same one of the first loader or the second loader.

13. A non-transitory computer readable medium storing a program causing a computer to execute a process for controlling a printer, the printer being configured to output sheets which are, in order, fed from a sheet feeder, printed upon and loaded in a first loader or a second loader in accordance with a print instruction, the process comprising:
   controlling the printer to output the sheets according to the print instruction,
   controlling the printer to output a check sheet and load the check sheet after the print instruction has been started but before all of the sheets have been printed upon and loaded, the check sheet being in addition to the sheets,
   determining whether the sheets and the check sheet are being output to a same one of the first loader or the second loader, and
   controlling the printer so the check sheet protrudes from the sheets when the sheets and the check sheet are being output to the same one of the first loader or the second loader.

14. An information control apparatus for controlling a printer, the printer being configured to output sheets which are, in order, fed from a sheet feeder, printed upon and loaded in a first loader or a second loader in accordance with a print instruction, the information control apparatus comprising:
   means for controlling the printer to output the sheets according to the print instruction,
   means for controlling the printer to output a check sheet and load the check sheet after the print instruction has been started but before all of the sheets have been printed upon and loaded, the check sheet being in addition to the sheets,
   means for determining whether the sheets and the check sheet are being output to a same one of the first loader or the second loader, and
   means for controlling the printer so the check sheet protrudes from the sheets when the sheets and the check sheet are being output to the same one of the first loader or the second loader.

\* \* \* \* \*